US005503179A

United States Patent [19]

Till

[11] Patent Number: 5,503,179

[45] Date of Patent: Apr. 2, 1996

[54] TAPPING FAUCET FOR POURING OUT BEVERAGES, IN PARTICULAR BEER

[76] Inventor: Rudolf Till, Kartunger Strasse 24, D-76546 Sinzheim, Germany

[21] Appl. No.: 186,679

[22] Filed: Jan. 25, 1994

[30] Foreign Application Priority Data

Jan. 26, 1993 [DE] Germany ............................ 9301038 U

[51] Int. Cl.[6] ................................ B08B 1/00; B08B 9/04; F16K 31/524

[52] U.S. Cl. .......................... 137/240; 15/3.5; 15/104.05; 15/104.062; 134/166 C; 137/244; 137/315; 222/148; 222/505; 222/514; 251/245; 251/246; 251/263

[58] Field of Search .................................... 137/315, 238, 137/240, 244, 242; 251/244, 245, 246, 251, 263; 15/104.5, 3.5, 104.62, 159.1, 244.1, 244.4; 134/166 R, 166 C; 222/148, 505, 507, 511, 514, 518

[56] References Cited

U.S. PATENT DOCUMENTS

| | | | |
|---|---|---|---|
| 612,947 | 10/1898 | Kiernan | 251/245 |
| 691,569 | 1/1902 | Pohlman | 251/246 |
| 1,219,923 | 3/1917 | Coonan | 251/263 |
| 1,673,880 | 6/1928 | Marden | 251/263 |
| 1,924,637 | 8/1933 | Carpenter | 251/246 |
| 2,019,257 | 10/1935 | Gibbs | 251/246 |
| 2,646,248 | 7/1953 | Cornelius | 251/263 |
| 2,715,010 | 8/1955 | Reeves | 251/263 |
| 3,146,477 | 9/1964 | Bergman et al. | 15/104.062 |
| 3,656,709 | 4/1972 | Shuffleburger et al. | 251/263 |
| 4,252,255 | 2/1981 | Henderson | 15/3.5 |
| 4,305,421 | 12/1981 | Fallon | 251/99 |
| 4,467,488 | 8/1984 | Creek | 15/3.5 |
| 5,095,572 | 3/1992 | Wagner | 15/104.062 |

*Primary Examiner*—George L. Walton
*Attorney, Agent, or Firm*—Collard & Roe

[57] ABSTRACT

A tapping faucet for dispensing beverages, in particular beer, includes a compensator arranged in a tapping faucet housing provided with a tapping faucet outlet and being a body which is conical at one end, and a closing seal operable via an actuating device, for example, a lever. The tapping faucet is characterized in that the compensator provided with a flow-through duct for the beer is installed in the beer conduit or shaft with its conical end in the direction of the front end of the tapping faucet housing, in which for forming an annular gap for the pressure compensation and for the opening and closing of the tapping faucet, a spring-loaded sealing and adjusting bushing provided with a corresponding conical cavity is arranged. The bushing is capable of being tightly pushed by the actuating device, for example, the lever, over the conical part of the compensator in the longitudinal direction, and away from the part for forming the annular gap.

6 Claims, 8 Drawing Sheets

TAPPING FAUCET FOR POURING OUT BEVERAGES, IN PARTICULAR BEER

BACKGROUND OF THE INVENTION

1. Field of the Invention

The present invention relates to a tapping faucet for pouring out or dispensing beverages, in particular beer, comprising a compensator arranged in a tapping faucet housing provided with a tapping faucet outlet and being a body which is conical at one end, and a closing seal operable via an actuating device, for example a lever.

2. The Prior Art

A known tapping faucet, which has become known under the name "compensator faucet"or "Kornelius faucet," consists of a housing with an outlet and a tilting lever arranged thereon, this lever leading to a faucet piston actuating a foam nozzle.

A compensator for the pressure regulation is located in the back end of the housing, this compensator being a body which is conical at one end, which body can be pushed more or less deeply into the housing by a regulating lever via a gear drive through which the flow-through is regulated, depending on the position on the regulating lever.

The known tapping faucet has certain disadvantages in that it has to be removed when the beer conduit is cleaned, or when a small cleaning sponge is removed, if need be. Furthermore, the structure of the known tapping faucet is relatively complicated due to the division of the beer-withdrawal process into two parts, namely the regulation of the flow-through via the compensator and the opening of the seal for discharging the beer.

SUMMARY OF THE INVENTION

It is an object of the present invention to provide a tapping faucet that is substantially simpler in structure, and with which it is possible to remove the cleaning liquid and the small cleaning sponges, if any, without complicated removal of the tapping faucet.

The above object is accomplished according to the present invention by providing a tapping faucet for pouring out or discharging beverages, in particular beer, that comprises a compensator arranged in a tapping faucet housing provided with a tapping faucet outlet, this compensator being a body which is conical at one end, and a closing seal that is operable via an actuating device, for example, a lever. The tapping faucet has the compensator, the latter being provided with a flow-through duct, being installed in the beer conduit or shaft with its conical end pointing in the direction of the front end of the tapping faucet housing. There is a spring-loaded sealing and adjusting bushing provided with a corresponding conical cavity arranged for forming an annular gap for the pressure compensator and opening and closing of the tapping faucet. This bushing is adapted for being tightly pushed by the actuating device, for example, the lever, over the conical part of the compensator in the longitudinal direction, and away from the part for forming the annular gap.

According to another embodiment, the tapping faucet according to the invention is characterized in that the sealing and adjusting bushing is completely drilled through and has at the front end an opening for removing the cleaning liquid and a small cleaning sponge, if any. This opening is sealable by a cap screw.

A further embodiment of the invention is that the actuating device includes a lever that is swivel-mounted in the housing of the tapping faucet, and with which the sealing and adjusting bushing can be pushed in a tight way over the conical part of the compensator in the longitudinal direction, and pushed away from this part for forming the annular gap.

With the tapping faucet according to the invention, an important advantage is obtained in that the compensator, due to the special installation, is a fixed component of the beer conduit and does not require any additional drive. This is because the annular gap required for the pressure reduction is formed by the sealing and adjusting bushing, which can be pushed on and retracted and which, therefore, serves simultaneously as a tight closure for the tapping faucet. Consequently, the closing seal and the formation of the annular gap for the tapping faucet are established in one unit.

In this connection, it is possible also with application of the same principle and with kinematic reversal to fix the sealing and adjusting bushing in the beer conduit, and to displace the correspondingly structured compensator lengthwise in the tapping faucet against a spring force or load by means of the actuating device.

The invention, furthermore, provides the important advantage that the small cleaning sponge and the cleaning liquid can be directly removed from the front of the faucet. Moreover, by mounting a cleaning adapter that can be screwed into the front opening of the sealing and adjusting nozzle instead of the cap screw, it is possible to carry out additional reverse flushing of the beer conduit.

BRIEF DESCRIPTION OF THE DRAWINGS

Other objects and features of the present invention will become apparent from the following detailed description considered in connection with the accompanying drawings which disclose the embodiments of the present invention. It should be understood, however, that the drawings are designed for the purpose of illustration only and not as a definition of the limits of the invention.

In the drawings, wherein similar reference characters ,denote similar elements throughout the several views.

DETAILED DESCRIPTION OF PREFERRED EMBODIMENTS

Figure 1:
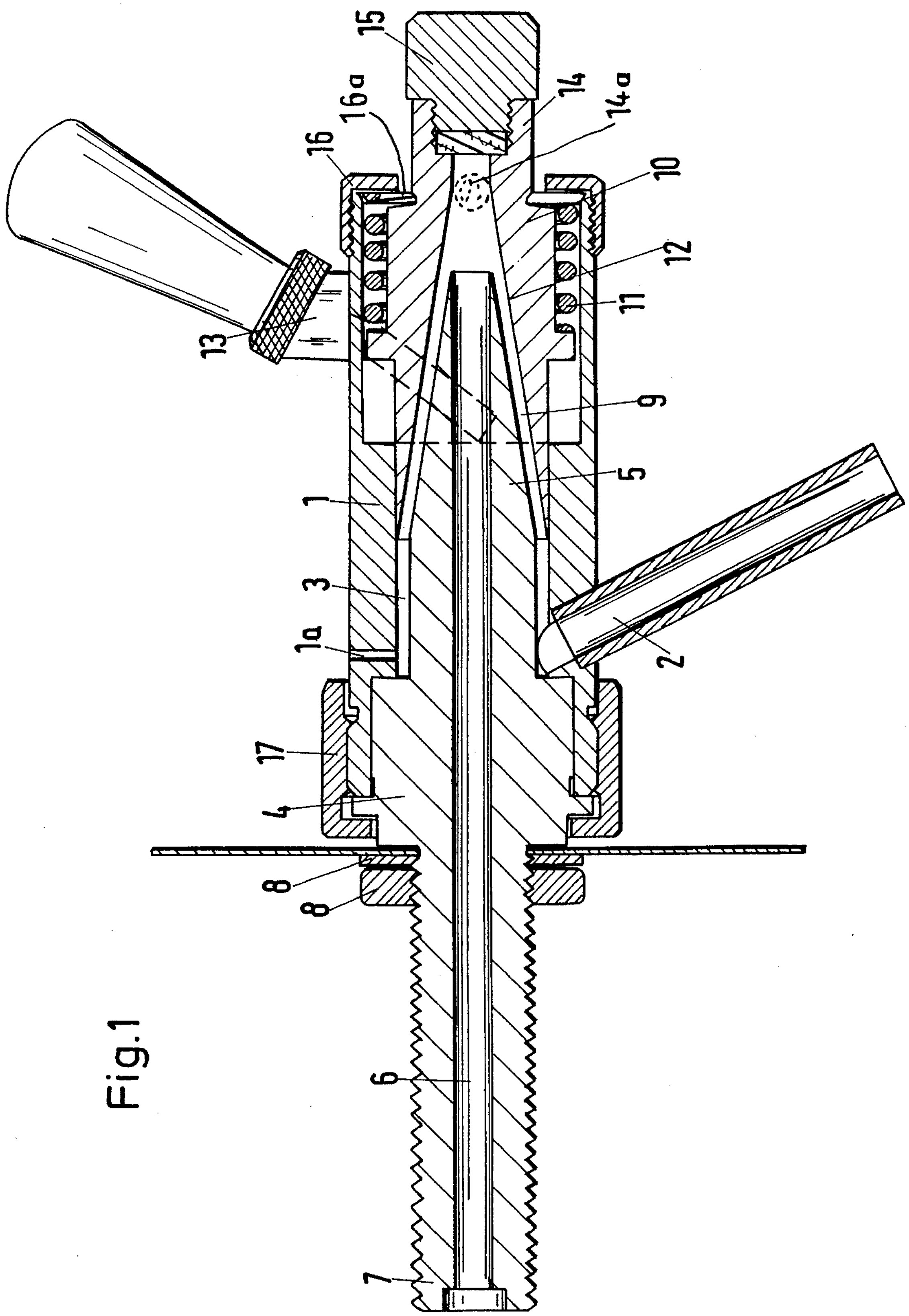
FIG. 1 shows a longitudinal section view of the open tapping faucet.

Turning now in detail to the drawings, FIG. 1 shows that the tapping faucet according to the invention includes an approximately cylindrical tapping faucet housing 1 with a vent opening 1*a*, on which a tapping faucet outlet 2 is present. In the tapping faucet housing 1, which has a hollow space 3, a compensator 4 is inserted, which comprises a cylindrical body which has a conical shape at the front side 5, and which has a bore 6 serving as the beer flow-through duct. At the back end, the compensator 4 has a thread connection 7 for the beverage conduit. The tapping faucet is fastened in the pouring column with a cap screw 8.

Thus, the compensator 4 forms a component of the beverage conduit, and its front, conical end points in the direction of the front end 16*a* of the tapping faucet housing 1.

For forming an annular gap 9, provision is made in the front end of the tapping faucet housing 1 for a longitudinally displaceable sealing and adjusting bushing 10, which is under the pressure of the coaxial spring 11. The sealing and adjusting bushing 10 has a conical cavity 12 conforming to the conical part 5 of the compensator 4. The sealing and adjusting bushing 10 can be tightly pushed over the conical part 5 of the compensator 4 by means of the actuating lever 13, or pushed away from this conical part for forming the annular gap 9.

At the front end, the sealing and adjusting bushing 10 has an opening 14 for removing the cleaning liquid or the cleaning sponge ball 14*a*. This opening 14 is normally closed by a screwed-on closing cap 15.

For pre-adjusting the flow-through regulation, the tapping faucet housing 1 is provided on the face of the front end 16*a* witch an adjusting nut 16. The compensator 4 is fixed in the tapping faucet housing 1 with a cap screw 17.

Now, FIG. 1 shows that the tapping faucet is in the open position. By means of the actuating lever 13 and guided by the tapping faucet housing 1, the sealing and adjusting bushing 10 is pushed away from the compensator 4 up to the stop of the sealing and adjusting bushing 10 against the pressure of the coaxial spring 11. This procedure produces an annular gap 9 between the conical part 5 of the compensator 4 and the conical cavity 12 of the sealing and adjusting bushing 10. Thus, the beverage can flow through this annular gap via the tapping faucet outlet 2 into a glass. Depending on how far the annular gap 9 is opened, the flow rate of the beverage changes and the pressure is reduced by a measured amount, so that the beverage, for example, the $CO_2$-containing beverage, can be discharged without overfoaming.

Figure 2:
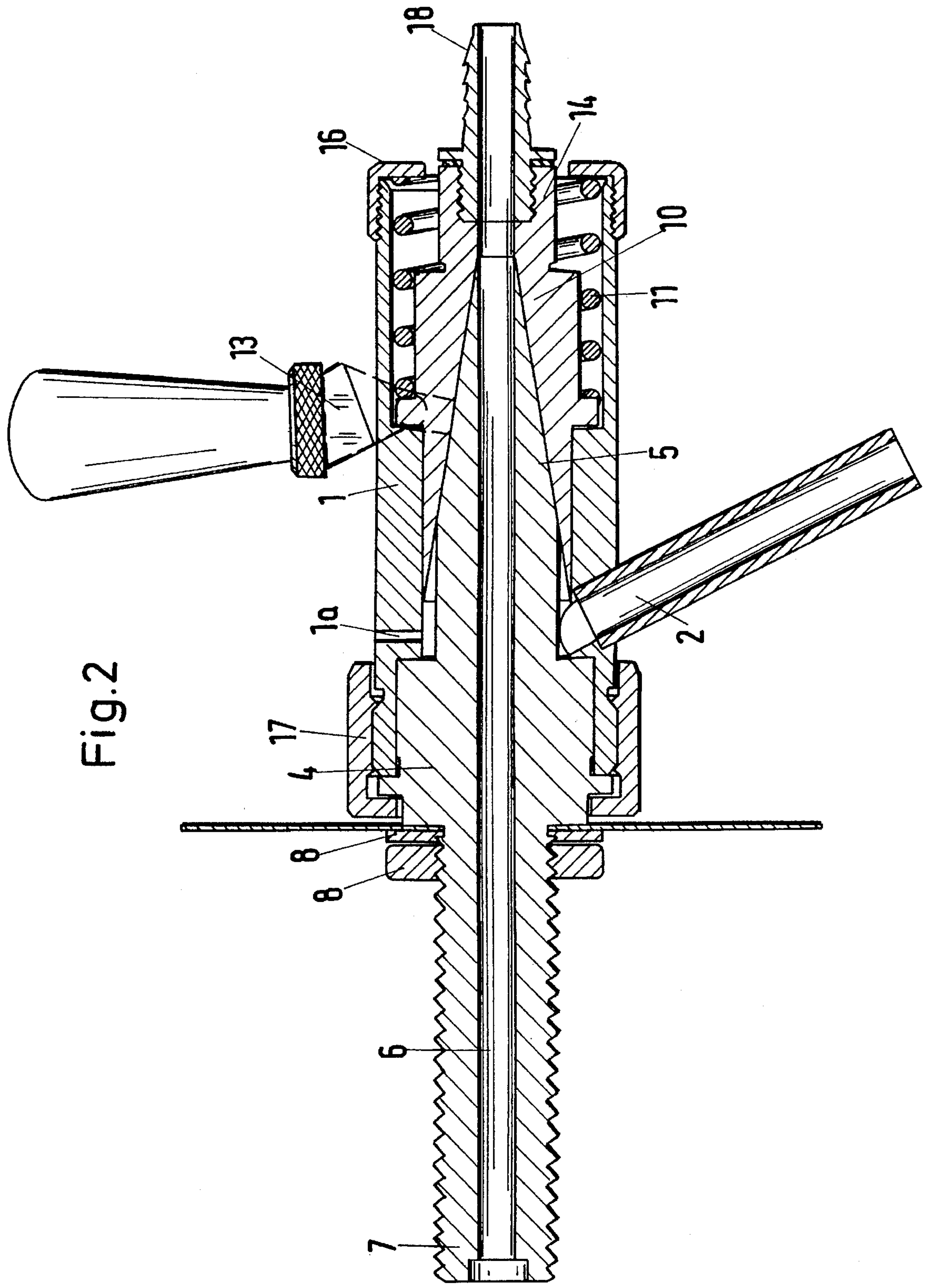
FIG. 2 shows a longitudinal section view of the closed tapping faucet, with inserted cleaning adapter.

FIG. 2 shows the tapping faucet in the closed position. In this regard, by releasing the operating lever 13, the sealing and adjusting bushing 10 is pressed against the conical part 5 of the compensator by spring 11. This causes the annular gap to be pressed in a sealing way against the cone of the compensator 4, and hence the tapping faucet is closed.

After removing the closing cap 15, and by screwing a cleaning adapter 18 into the opening 14, the beverage conduit can be cleaned without removing the tapping faucet.

Figure 3:
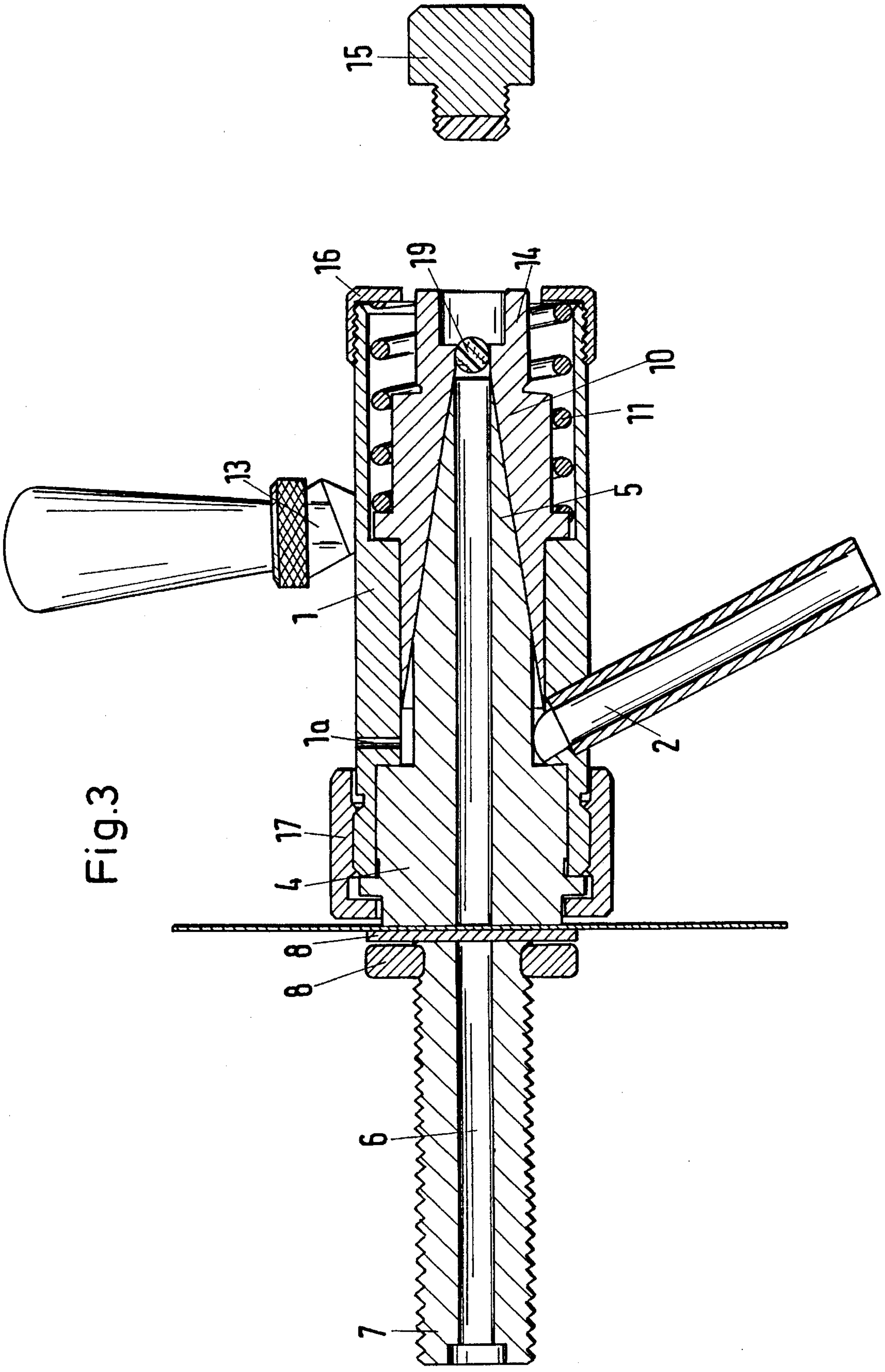
FIG. 3 shows the tapping faucet of FIG. 2, with an opening for removing a small cleaning ball.

FIG. 3 shows an embodiment similar to the one in FIG. 2, whereby a small ball 19 can be removed, following cleaning of the beverage conduit, by unscrewing the closing cap 15.

Figure 4:
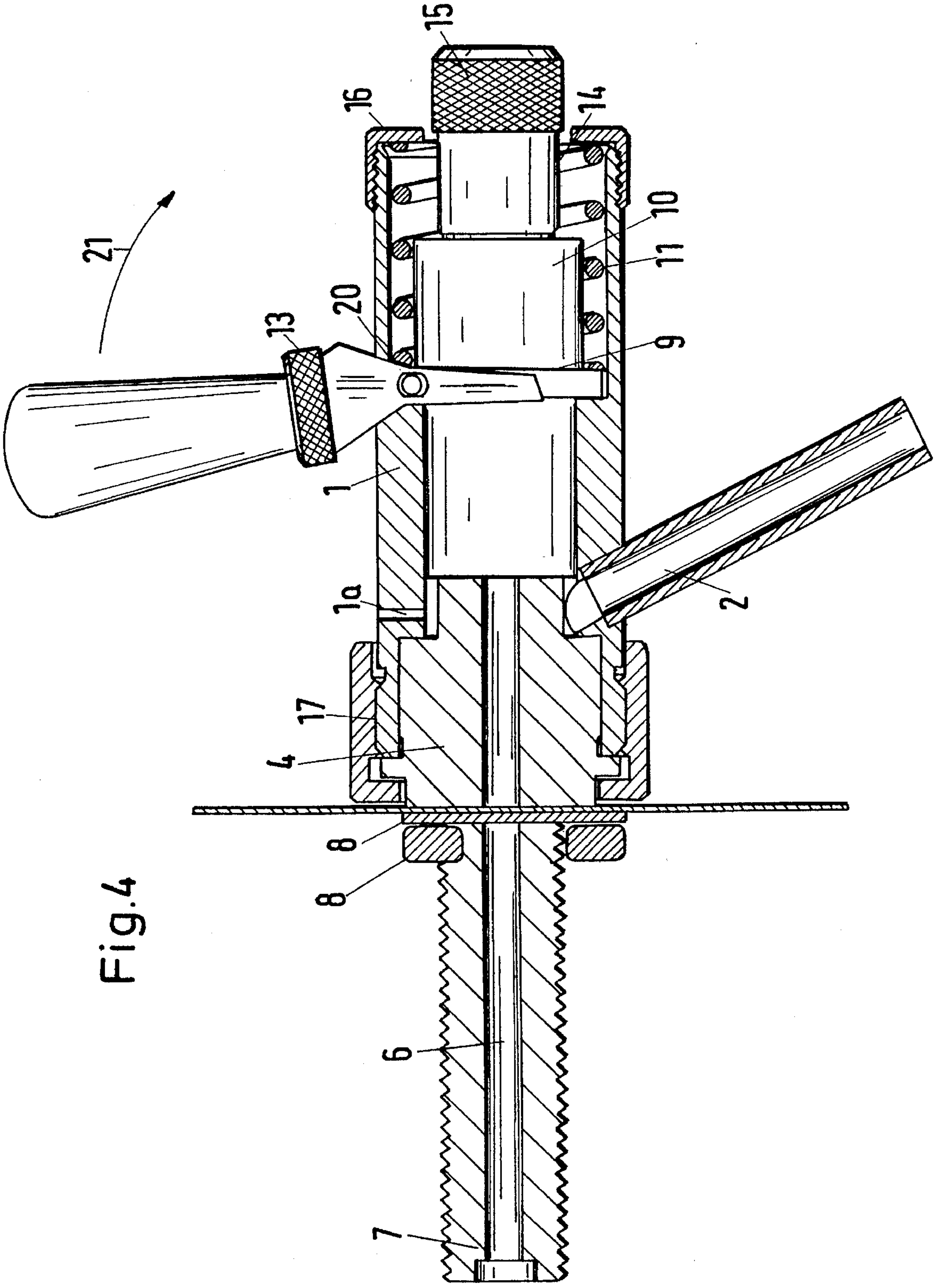
FIG. 4 shows, in a partial section view, a lateral view of the tapping faucet according to the invention, whereby the systematics of manual actuation by means of a lever can be seen.

FIG. 4 shows the systematics of manual actuation by means of the lever 13. The manual lever 13 is swivel-mounted around pin 20. When the lever 13 is swivelled to the front in the direction of arrow 21 (FIG. 1), the sealing and adjusting bushing 10 is also moved to the front by such action, which produces the annular gap 9, and the liquid or beer can pass through the duct 6 to the tapping faucet outlet 2.

Figure 5:
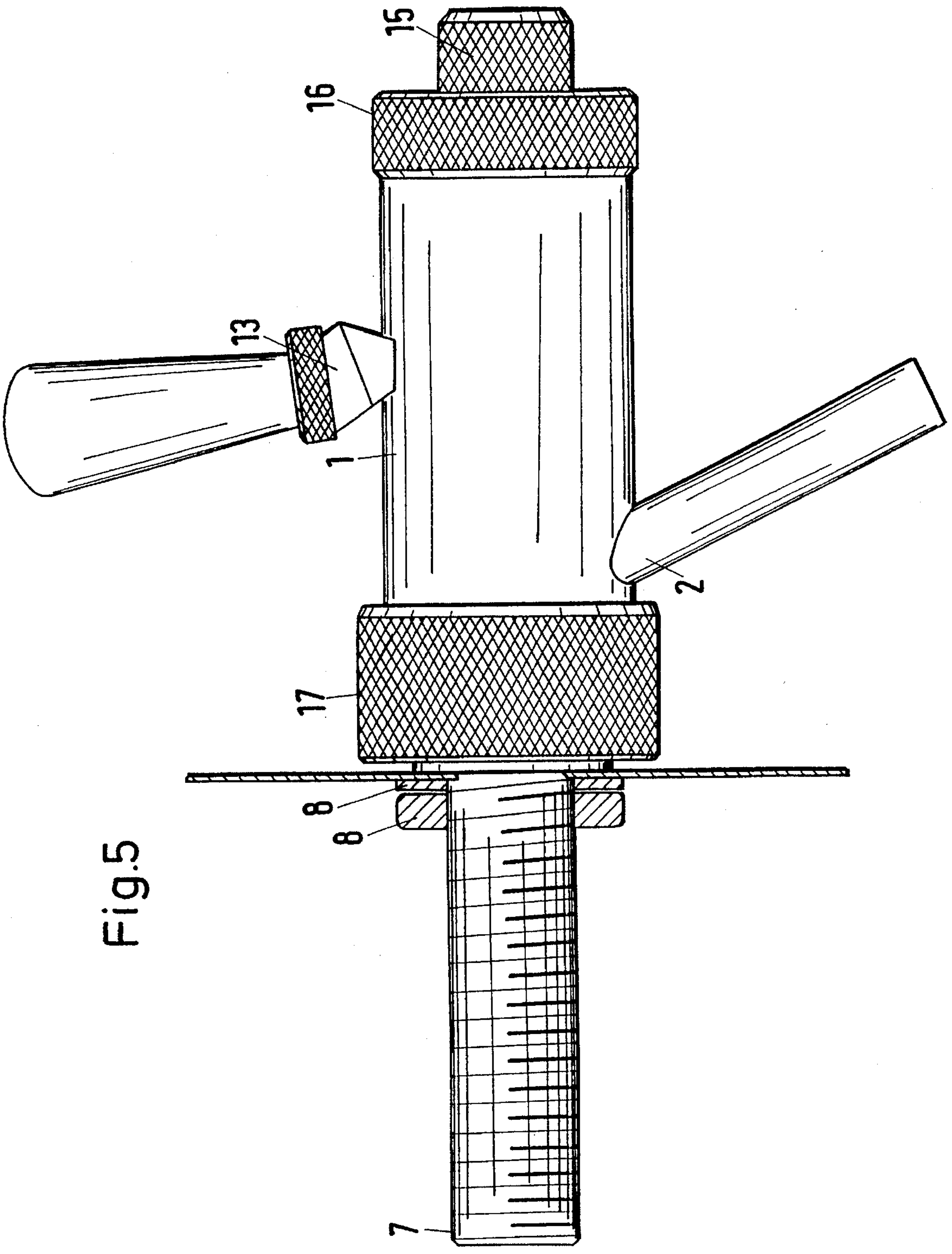
FIG. 5 shows an external view of the tapping faucet according to the invention.

FIG. 5 shows an external view of the tapping faucet.

FIGS. 6, 7, 8*a* and 8*b* show another embodiment of the tapping faucet according to the invention. These figures show that the tapping faucet according to the invention has a compensator 4 provided with a flow-through duct 6 for the beer. This compensator is installed with its conical end 5 in the beer conduit or shaft in the direction of the front end 40 of the tapping faucet housing 1. The tapping faucet housing 1 has a front compensation sealing sleeve 22 with a tapping faucet outlet 23. This sleeve is detachable and sliding on the compensator 4. The compensation sealing sleeve 22 has a conical cavity which, in the closed position (FIG. 7), is tightly pressed against the conical end 26 of the compensator 4 by the pressure of a coaxial spring 25 resting against a fixed stop 24.

Figure 6:
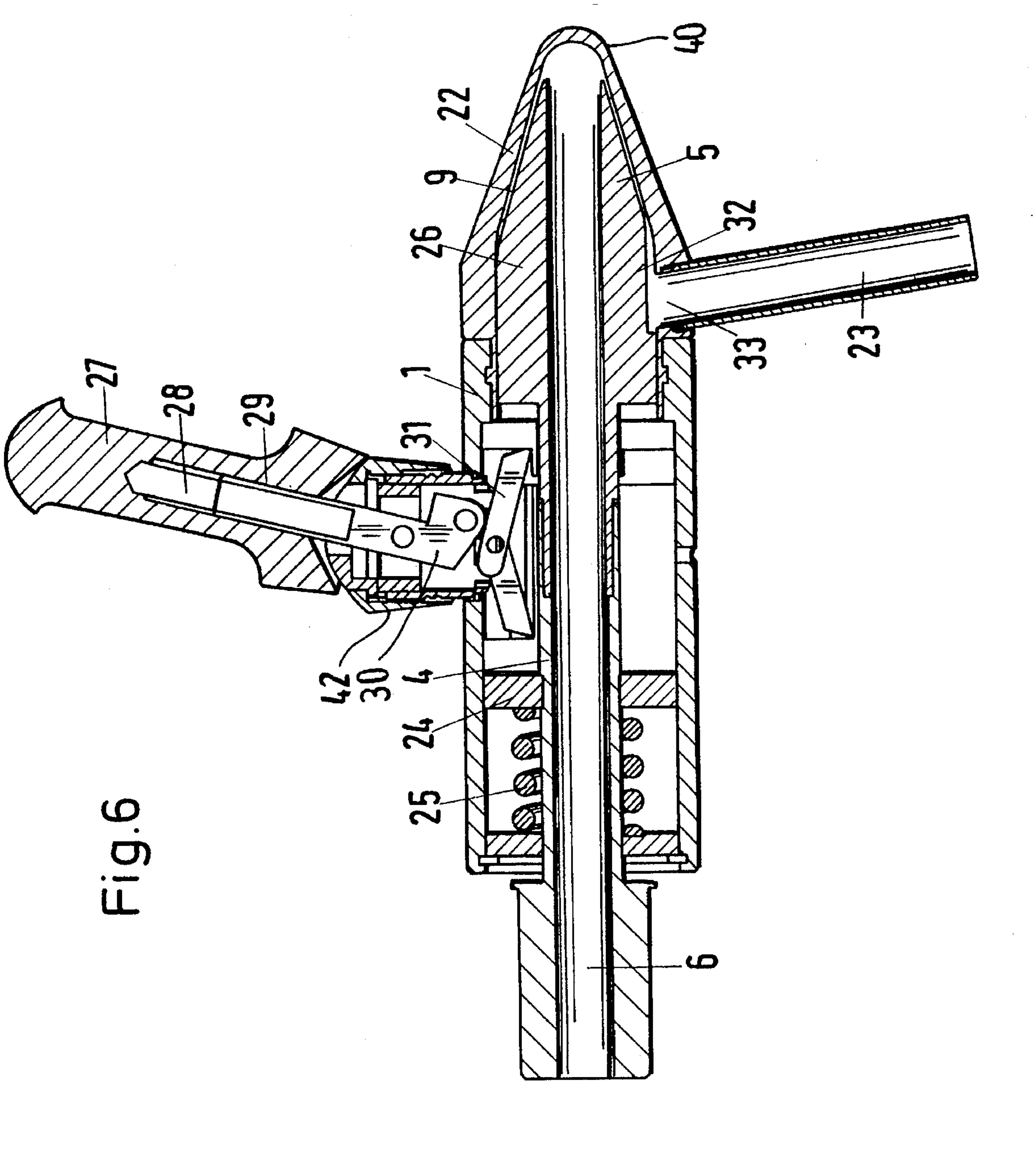
FIG. 6 shows a longitudinal section view of another embodiment of the open tapping faucet.
Figure 7:
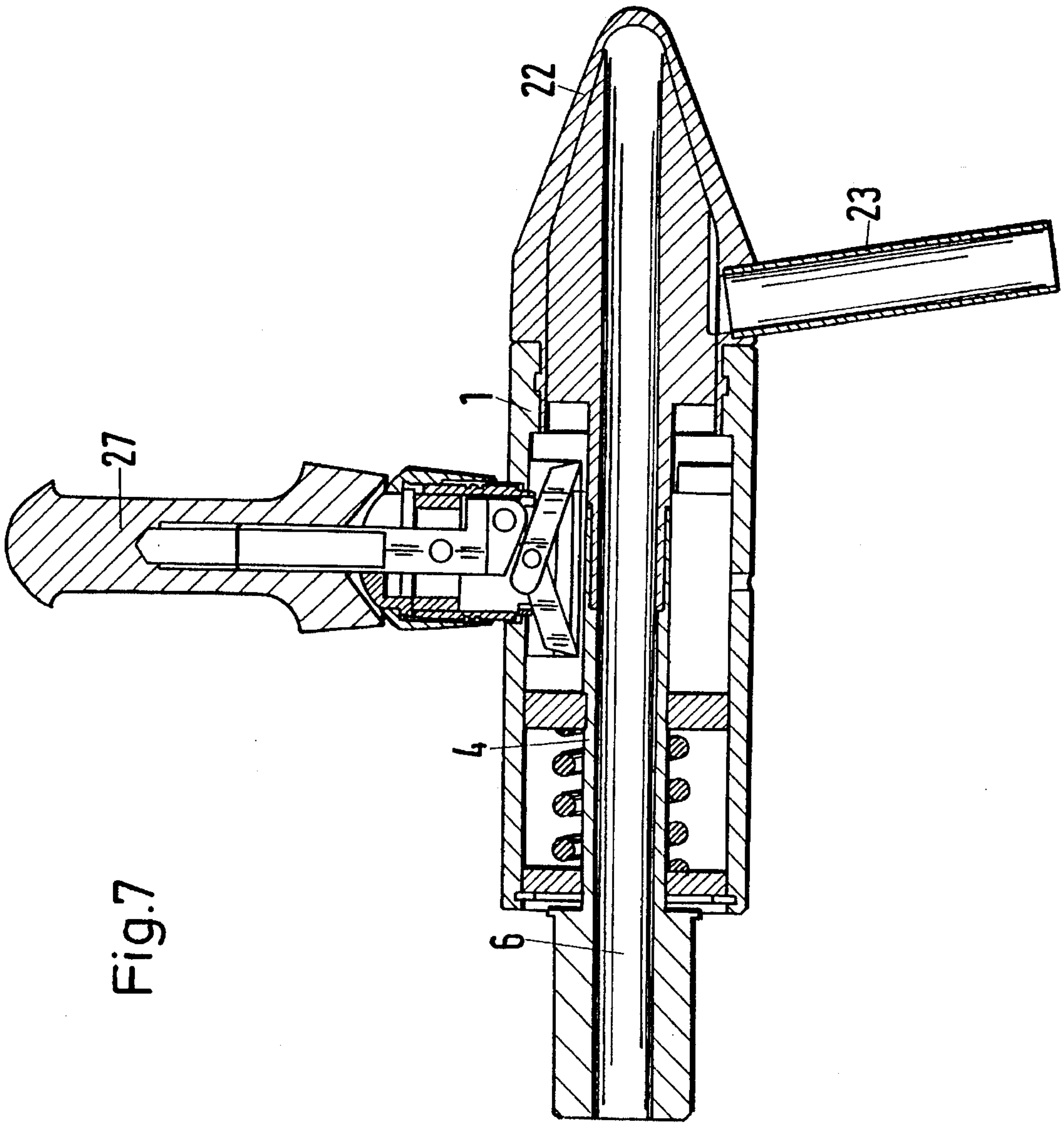
FIG. 7 shows a longitudinal section view of the closed tapping faucet according to FIG. 6.

In the open position of the tapping faucet, the tapping lever 27 is moved in the direction of the front end of the compensation sealing sleeve 22. In the handle of the tapping lever 27, provision is made for an inside guide 28 for a swivel-mounted lever 29. The lever 29 is positioned within the inside guide. With its lower end 30, the lever 29 rests against an adjustable cam contour 31. FIG. 6 shows that by sliding on the cam contour, the tapping faucet housing 1 is moved forward with the compensation sealing sleeve, so that an annular gap 9 is opened which, with constant size of the annular gap, widens conically toward the rear part of the tapping faucet. The beer flows from the beverage conduit through the central bore 6 in the stationary compensator 4 and subsequently on its front side flows into its externally disposed annular gap 9. At its front conical end, the compensator furthermore has a reduced wall thickness 32 which is thinner than the thickness of conical end 26. Thus, a partially hollow-cylindrical low-pressure space 33 is produced, into which the beer flows without pressure, and from there into the tapping faucet outlet 23.

Opening of the annular gap takes place according to the inclination of the tapping lever. The translation between the position of the lever and the width of the annular gap 9 is accomplished with the cam contour 31. A larger angle on the tapping faucet lever means a wider annular gap, which in turn leads to a larger flow of volume with the given conveying pressure.

The volume flow can be reduced or increased by adjusting the adjusting nut 42. If the tapping lever is shifted into the end position (FIG. 6), it can be locked, and the beer flows continuously from the faucet.

Figure 8B:
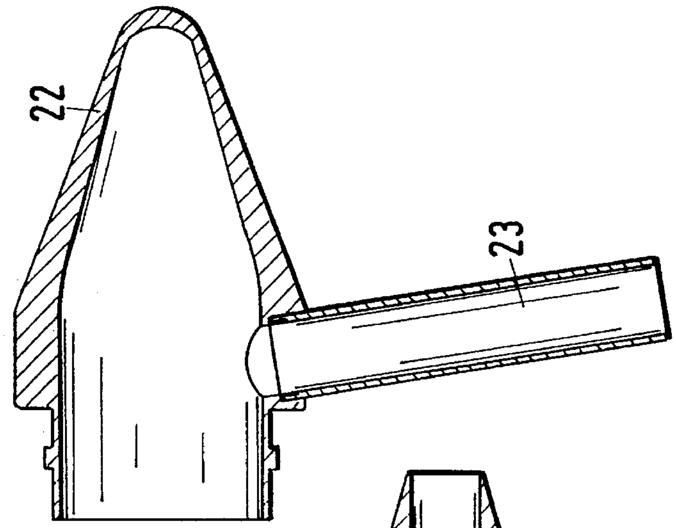
FIGS. 8*a* and 8*b* show two sectional drawings of the dismantled tapping faucet according to FIGS. 6 and 7.
Figure 8A:
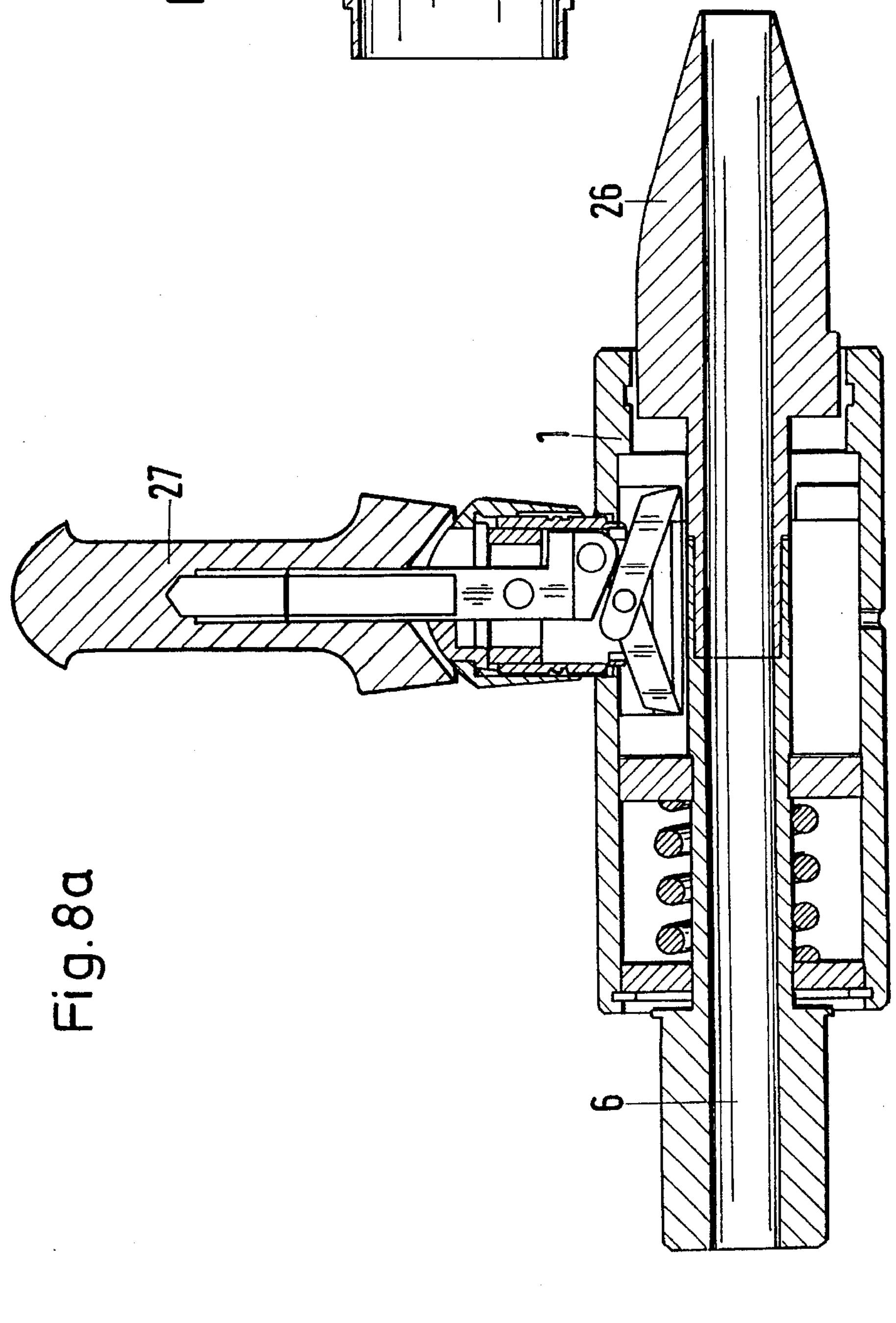

FIGS. 8*a* and 8*b* show that dismantling of the tapping faucet is very simple. The compensation sealing sleeve 22 is turned to the left by 90 degrees and pulled off to the front. Since the tapping faucet consists of only two parts in the beverage field, no further dismantling of the tapping faucet for cleaning is required. With the compensator 4 exposed, cleaning can be carried out with a brush or sponge. The same applies to the compensation sealing sleeve 22.

The tapping faucet according to the invention is suitable not only for beverages but for liquids of all types, in particular also for sample taking.

The spring 11 or 25 of the tapping faucet according to the invention can be replaced also by a force-locking and/or form-locking mechanism. For this purpose, provision can be made for a cam control, a pneumatic control, an electromagnetic control or a hydraulic control as actuating device.

While several embodiments of the present invention have been shown and described, it is to be understood that many changes and modifications may be made thereunto without departing from the spirit and scope of the invention as defined in the appended claims.

What is claimed is:

1. A tapping faucet for dispensing a beverage, comprising:

a tapping faucet housing having a tapping faucet outlet;

a compensator in the tapping faucet housing having a body which is conical at one end;

a closing seal;

an actuating device coupled to the closing seal for operating said closing seal;

said compensator having a flow-through duct for the beverage, installed in a beverage conduit shaft with the conical end facing in the direction of a front end of the tapping faucet housing;

a spring-loaded sealing and adjusting bushing for defining an annular gap for pressure compensation and for opening and closing the tapping faucet, the bushing being provided with a conical cavity corresponding to the body of said compensator and arranged adjacent to said conical end, said bushing being adapted for being tightly pushed by the actuating device, over said conical end of said compensator in a longitudinal direction, and away from said conical end for forming the annular gap; and wherein the sealing and adjusting bushing is completely drilled through and has on a front side an opening for removing a cleaning liquid and a small cleaning sponge; and a screw cap for sealing and unsealing said opening.

2. The tapping faucet according to claim 1, wherein the actuating device comprises a lever swivel-mounted in said tapping faucet housing, said lever pushing the sealing and adjusting bushing snugly over said conical end of the compensator in a longitudinal direction, and pushing said bushing away from said conical end for defining said annular gap.

3. A tapping faucet for dispensing a beverage comprising:

a tapping faucet housing having a tapping faucet outlet and a tapping faucet lever connected to said tapping faucet housing;

a compensator in the tapping faucet housing having a body which is conical at one end;

a closing seal;

an actuating device coupled to the closing seal for operating said closing seal;

said compensator having a flow-through duct for the beverage installed in the beverage conduit shaft with the conical end in the direction of the front end of the tapping faucet housing;

said housing having a front compensation sealing sleeve with a tapping faucet outlet, said sleeve being detachable and sliding on said compensator;

a spring resting against a fixed stop, said spring, in the open condition of the tapping faucet, being pullable from said compensator to the front by the tapping faucet lever for defining an annular gap, said spring forcing said conical end of said compensator into a conical cavity in the closed condition of the tapping faucet;

wherein the tapping lever comprises a handle having a swivel-mounted lever bar therein;

an inside guide, the swivel-mounted lever bar positioned within said inside guide;

a cam having an adjustable contour; and the lever bar having one end in pivotal engagement with the adjustable cam contour in such a way that the annular gap is substantially opened, depending on the inclination of the tapping lever and the lever bar.

4. The tapping faucet according to claim 3, wherein above the tapping faucet outlet, the compensator has a reduced wall thickness for defining a partially hollow-cylindrical low-pressure space.

5. The tapping faucet according to claim 3, wherein the spring is replaced by a force-locking mechanism.

6. The tapping faucet according to claim 3, wherein the spring is replaced by a form-locking mechanism.

* * * * *